US009066624B2

(12) United States Patent
Cahen et al.

(10) Patent No.: US 9,066,624 B2
(45) Date of Patent: Jun. 30, 2015

(54) LIQUID FOOD OR BEVERAGE MACHINE HAVING A DRIP TRAY AND A CUP SUPPORT

(75) Inventors: Antoine Cahen, Lausanne (CH); Stefan Kaeser, Aarau (CH); Alexandre Kollep, Lutry (CH); Frank Kräuchi, Epautheyres (CH); Matthieu Ozanne, Chessel (CH); Alfred Yoakim, St.-Legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 591 days.

(21) Appl. No.: 12/747,794

(22) PCT Filed: Dec. 9, 2008

(86) PCT No.: PCT/EP2008/067079
§ 371 (c)(1),
(2), (4) Date: Jun. 11, 2010

(87) PCT Pub. No.: WO2009/074557
PCT Pub. Date: Jun. 18, 2009

(65) Prior Publication Data
US 2010/0263550 A1    Oct. 21, 2010

(30) Foreign Application Priority Data
Dec. 12, 2007   (EP) .................................... 07123009

(51) Int. Cl.
*A47J 31/18* (2006.01)
*A47J 31/44* (2006.01)

(52) U.S. Cl.
CPC ........ *A47J 31/4403* (2013.01); *Y10T 29/49826* (2015.01); *A47J 31/18* (2013.01); *A47J 31/4421* (2013.01); *A47J 31/4485* (2013.01); *A47J 2201/00* (2013.01)

(58) Field of Classification Search
USPC ............... 99/279, 284, 289 R, 290–295, 300, 99/302 R, 302 P, 307, 323.1; 141/351, 362
See application file for complete search history.

(56) References Cited

U.S. PATENT DOCUMENTS

| 2,927,533 A | 3/1960 | Luehrs |
| 3,218,955 A | 11/1965 | Lorang ......................... 99/282 |

(Continued)

FOREIGN PATENT DOCUMENTS

| AT | 410377 | 4/2003 |
| CH | 682 798 | 11/1993 |

(Continued)

OTHER PUBLICATIONS

P. 66 of the official Diary of Chile listing CL 3721-08 (corresponding to US 2010/0263543A1) dated Jan. 8, 2010.

(Continued)

*Primary Examiner* — Brian Jennison
(74) *Attorney, Agent, or Firm* — Winston & Strawn LLP

(57) ABSTRACT

A machine for preparing a liquid food or beverage that includes a liquid food or beverage module having a liquid or beverage outlet; a support device that is located under the beverage outlet and that has an arrangement for evacuating liquid; and a collector, such as drip tray, for collecting liquid evacuated by the support device. The support device has a dispensing area on or above which a recipient may be placed for collecting a liquid food or beverage dispensed from the outlet. The support device also includes a non-dispensing area adjacent to the dispensing area, the non-dispensing area being arranged to support recipients upon use and for evacuating liquid to the collector.

21 Claims, 2 Drawing Sheets

(56) References Cited

U.S. PATENT DOCUMENTS

| | | | |
|---|---|---|---|
| 3,938,492 A | 2/1976 | Mercer, Jr. | |
| 4,054,085 A | 10/1977 | Tarr | |
| 4,164,306 A | 8/1979 | Perrin | |
| 4,253,385 A | 3/1981 | Illy | 99/281 |
| 4,377,049 A | 3/1983 | Simon et al. | 40/465 |
| 4,389,925 A | 6/1983 | Piana | |
| 4,458,735 A | 7/1984 | Houman | 141/95 |
| 4,554,419 A | 11/1985 | King et al. | 200/5 |
| 4,681,495 A | 7/1987 | Crespin et al. | 411/298 |
| 4,757,753 A * | 7/1988 | Pandolfi | 99/290 |
| 4,767,632 A | 8/1988 | Meier | 426/231 |
| 4,829,888 A | 5/1989 | Webster | |
| 4,892,031 A | 1/1990 | Webster et al. | |
| 4,954,697 A | 9/1990 | Kokubun et al. | 235/381 |
| 5,036,998 A | 8/1991 | Dunn | |
| 5,161,455 A | 11/1992 | Anson et al. | 99/280 |
| 5,193,701 A | 3/1993 | Bush et al. | |
| 5,312,020 A | 5/1994 | Frei | 222/129.1 |
| 5,335,705 A | 8/1994 | Morishita et al. | 141/275 |
| 5,353,692 A * | 10/1994 | Reese et al. | 99/289 T |
| 5,372,061 A | 12/1994 | Albert et al. | 99/281 |
| 5,375,508 A | 12/1994 | Knepler et al. | 99/280 |
| 5,498,757 A | 3/1996 | Johnson et al. | |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A | 1/1999 | Cortese | |
| 5,890,615 A | 4/1999 | Petras | |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A * | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 | 12/2001 | Karkos, Jr. | |
| 6,345,570 B1 | 2/2002 | Santi | |
| 6,354,341 B1 | 3/2002 | Saveliev et al. | 141/94 |
| 6,582,002 B2 | 6/2003 | Hogan et al. | |
| 6,759,072 B1 | 7/2004 | Gutwein et al. | 426/433 |
| 7,028,603 B1 | 4/2006 | Gremillion et al. | 99/290 |
| 7,093,533 B2 | 8/2006 | Tebo, Jr. et al. | |
| 7,210,401 B1 | 5/2007 | Rolfes et al. | 99/289 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 8,695,484 B2 | 4/2014 | Mori | |
| 8,800,433 B2 | 8/2014 | Cahen et al. | |
| 2002/0185016 A1 | 12/2002 | Hoffjann et al. | |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1 | 11/2005 | Hart et al. | |
| 2007/0056994 A1 | 3/2007 | Woodnorth et al. | |
| 2007/0062378 A1 | 3/2007 | Glucksman et al. | |
| 2007/0157820 A1 | 7/2007 | Bunn | 99/275 |
| 2007/0175338 A1 * | 8/2007 | Glucksman et al. | 99/279 |
| 2009/0101021 A1 | 4/2009 | Tonelli et al. | 99/290 |
| 2009/0173235 A1 | 7/2009 | Kollep et al. | 99/279 |
| 2010/0251900 A1 | 10/2010 | Cahen et al. | 99/323.1 |
| 2010/0263543 A1 | 10/2010 | Krauchi et al. | 99/280 |
| 2010/0263547 A1 | 10/2010 | Cahen et al. | 99/300 |
| 2010/0300301 A1 | 12/2010 | Cahen et al. | 99/323.1 |
| 2011/0041698 A1 | 2/2011 | Mori | 99/290 |

FOREIGN PATENT DOCUMENTS

| | | |
|---|---|---|
| CN | 2235252 Y | 9/1996 |
| CN | 1209041 A | 2/1999 |
| CN | 2387836 | 7/2000 |
| CN | 2682954 Y | 3/2005 |
| CN | 1875831 | 12/2006 |
| DE | 44 29 353 | 2/1996 |
| DE | 20 2006 002 124 | 5/2006 |
| DE | 20 2006 019 039 | 4/2007 |
| DE | 102006060748 | 1/2008 |
| EP | 0 549 887 | 7/1993 |
| EP | 0 838 186 | 4/1998 |
| EP | 08155753.0 | 7/2003 |
| EP | 1 440 639 | 7/2004 |
| EP | 1 448 084 | 8/2004 |
| EP | 1 676 509 | 7/2006 |
| EP | 1 707 088 | 10/2006 |
| EP | 1 731 065 | 12/2006 |
| EP | 1772081 A1 | 4/2007 |
| EP | 1 798 457 | 6/2007 |
| EP | 1 859 713 | 11/2007 |
| EP | 08155851.2 | 11/2007 |
| EP | 1 864 598 | 12/2007 |
| EP | 1 867 260 | 12/2007 |
| EP | 1 878 368 | 1/2008 |
| EP | 2 070 454 | 6/2009 |
| FR | 2 440 720 | 11/1979 |
| FR | 2 544 185 A3 | 10/1984 |
| FR | 2 554 185 | 5/1985 |
| FR | 2 624 844 | 6/1989 |
| FR | 2648695 Y | 12/1990 |
| GB | 2 397 510 | 7/2004 |
| GB | 2 421 423 | 6/2006 |
| JP | 50054990 A | 5/1975 |
| JP | 51135081 U | 11/1976 |
| JP | 52138542 U | 10/1977 |
| JP | 54065788 U | 5/1979 |
| JP | 55-128626 U1 | 9/1980 |
| JP | 59174120 A | 10/1984 |
| JP | 61119218 A | 6/1986 |
| JP | 62-100138 U | 6/1987 |
| JP | 0638880 A2 | 2/1994 |
| JP | 11253330 A2 | 9/1999 |
| JP | 2001222761 A | 8/2001 |
| JP | 2002191505 A | 7/2002 |
| JP | 2004527893 A | 9/2004 |
| JP | 2006341097 A | 12/2006 |
| LU | 85318 | 9/1984 |
| RU | 2294875 C2 | 3/2007 |
| SU | 1797482 A3 | 2/1993 |
| WO | WO97/24052 | 7/1997 |
| WO | WO 97/25634 | 7/1997 |
| WO | WO 99/50172 | 10/1999 |
| WO | WO01/52704 A1 | 7/2001 |
| WO | WO 02/059534 | 8/2002 |
| WO | WO02/070371 A2 | 9/2002 |
| WO | WO 02/097927 | 12/2002 |
| WO | WO02097927 A1 | 12/2002 |
| WO | WO 03/039309 | 5/2003 |
| WO | WO 03/075629 | 9/2003 |
| WO | WO 03/093142 A1 | 11/2003 |
| WO | WO 2004/030435 | 4/2004 |
| WO | WO 2004/030438 | 4/2004 |
| WO | WO 2005/099535 | 10/2005 |
| WO | WO 2006/050900 | 5/2006 |
| WO | WO 2006/063645 | 6/2006 |
| WO | WO 2006/082064 | 8/2006 |
| WO | WO 2006/090183 | 8/2006 |
| WO | WO 2006/122916 | 11/2006 |
| WO | WO 2007/003062 | 1/2007 |
| WO | WO 2007/003990 | 1/2007 |
| WO | WO 2007/141334 | 12/2007 |
| WO | WO 2008/046837 | 4/2008 |
| WO | WO 2008/104751 | 9/2008 |
| WO | WO 2008/138710 | 11/2008 |
| WO | WO 2008/138820 | 11/2008 |
| WO | WO 2011/092644 | 8/2011 |

OTHER PUBLICATIONS

Chilean Search Report for CL 3720-08 dated Feb. 7, 2011 (corresponding to US 2010-0263547A1).

CL-2023-07 cited in Chilean Search Report, CL 3720-08 dated Feb. 7, 2011 (corresponding to US 2009-0173235A1).

International Search Report, PCT/EP2008/067072, mailed Oct. 9, 2009.

(56) References Cited

OTHER PUBLICATIONS

International Search Report, PCT/EP2008/067075, mailed Aug. 27, 2009.
International Search Report, PCT/EP2008/067077, mailed Oct. 14, 2009.
International Search Report, PCT/EP2008/067079, mailed Apr. 9, 2009.
International Search Report, PCT/EP2008/067083, mailed Apr. 16, 2009.
European Search Report, Application No. EP 10167803 mailed Aug. 27, 2010.
U.S. Appl. No. 12/747,841, Non-Final Office Action, dated Dec. 18, 2012.
U.S. Appl. No. 12/988,295, Restriction Requirement, dated Aug. 16, 2012.
U.S. Appl. No. 12/747,820, Restriction Requirement, dated Feb. 15, 2013.
U.S. Appl. No. 12/747,684 Non-Final Office Action dated Mar. 11, 2013.
Japanese Office Action, Application No. P2013-170594, dated Jun. 24, 2014 with English translation for relevant portion(s) of JP references JP62100138 and JP55128626.
U.S. Appl. No. 12/747,684 Non-Final Office Action, May 27, 2014.
U.S. Appl. No. 12/747,820 Final Office Action dated Dec. 4, 2013.
U.S. Appl. No. 12/747,820 Advisory Action dated Feb. 12, 2014.
U.S. Appl. No. 12/747,743 Notice of Allowance and Fees Due (PTOL-85) dated Apr. 2, 2014.
P007910120—Kaffeevollautomatern Magnifica II—ESAM 300 B—Mar. 12, 2007.
U.S. Appl. No. 12/747,743 Non-Final Office Action, dated Sep. 25, 2013.
U.S. Appl. No. 12/747,684, Advisory Action, dated Nov. 13, 2013.
U.S. Appl. No. 12/988,295, Notice of Allowance, dated Dec. 2, 2013.
U.S. Appl. No. 12/747,820 Final Office Action, dated Dec. 4, 2013.
U.S. Appl. No. 12/747,841 Non-Final Office Action, Jul. 22, 2014.
U.S. Appl. No. 12/747,743, Non-Final Office Action, dated Apr. 11, 2013.
U.S. Appl. No. 12/988,295, Non-Final Office Action, dated May 6, 2013.
U.S. Appl. No. 12/747,841, Final Office Action, dated May 13, 2013.
U.S. Appl. No. 12/747,684 Final Office Action dated Jul. 30, 2013.
U.S. Appl. No. 12/988,295 Final Office Action dated Jul. 24, 2013.
U.S. Appl. No. 12/747,820 Non-Final Office Action dated Aug. 2, 2013.
U.S. Appl. No. 12/747,841, Advisory Action, dated Jul. 26, 2013.

\* cited by examiner

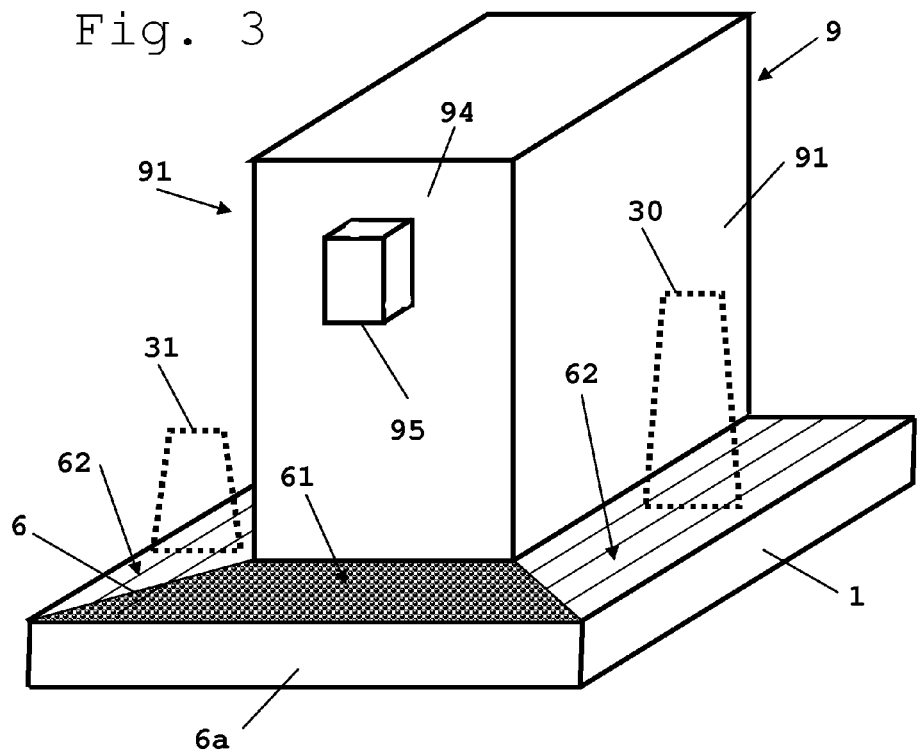
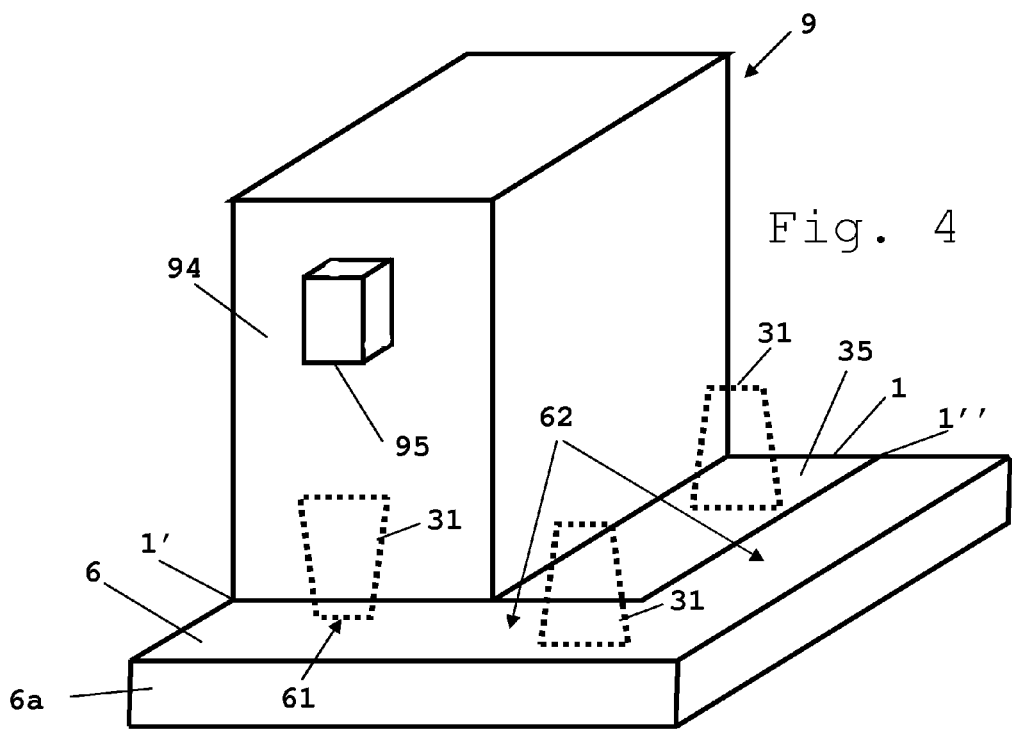

LIQUID FOOD OR BEVERAGE MACHINE HAVING A DRIP TRAY AND A CUP SUPPORT

This application is a 371 filing of International Patent Application PCT/EP2008/067079 filed Dec. 9, 2008.

FIELD OF THE INVENTION

The field of the invention pertains to beverage machines having a drip tray with support device for cups, mugs or other recipients.

BACKGROUND ART

Certain beverage or food preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Typically, the beverage outlet is located above a grid for supporting a cup or other recipient under the outlet and for the passage of possible drips from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water.

Drip tray devices with cup supports are well known in the art. There are also such devices that are further arranged for allowing the adjustment of the vertical position under the beverage outlet of cups of different sizes.

For instance, EP 1 867 260 discloses a drip tray with a cup support that is movably mounted, generally at mid-height, onto a beverage machine. The cup support has an operative horizontally extending position for positioning a small cup under the machine's beverage outlet and can be pivoted upwards against the machine's main body or otherwise moved so as to give sufficient space for positioning a large cup under the beverage outlet on a support surface located below this above movable cup support.

EP 0 549 887 and U.S. Pat. No. 5,161,455 also disclose devices with an adjustable cup support for small and large receptacles.

U.S. Pat. No. 5,353,692 discloses a beverage vending machine having a cup station with an upper beverage outlet and a bottom drain-gate on a drip collector. Above the drain gate, the cup station has a retractable support member for positioning small cups under the beverage outlet. This cup station is formed as a grid for allowing the passage of drips down to the drain-gate.

EP 1 731 065 discloses a beverage machine that has a drip tray device located under a beverage outlet. This device has a first support grid for a first beverage recipient covering a drip tray or collection tank. The first support grid is removable form the drip tray to give access to a second support thereunder for supporting a larger cup under the outlet.

There is still a need to increase the versatility of liquid food or beverage machines, in particular their drip tray device with a cup or mug support.

SUMMARY OF THE INVENTION

The invention thus relates to a machine for preparing a liquid food or beverage, in particular from a pre-portioned beverage or food ingredient such as an ingredient contained in a capsule or pod.

For instance, the machine is a coffee, tea or soup preparation machine. In particular, the device is arranged for preparing within the liquid food or beverage module a beverage or liquid food by passing hot or cold water or another liquid through a capsule or pod containing an ingredient of the beverage or liquid food to be prepared, such as ground coffee or tea or chocolate or cacao or milk powder.

The machine of the invention comprises: a liquid food or beverage module having a liquid or beverage outlet; a support device that is located under the beverage outlet and that has an arrangement for evacuating liquid; and a collector, such as a drip tray, reservoir or tank, for collecting liquid evacuated by the support device. The support device comprises a dispensing area on or above which a recipient, such as a cup or mug, may be placed for collecting a liquid food or beverage dispensed from the outlet. In accordance with the invention, the support device further comprises a non-dispensing area adjacent to the dispensing area, the non-dispensing area being arranged to support recipients upon use and for evacuating liquid to the collector.

In other words, the support device may have an area which is not arranged for the dispensing of liquid food or beverage or to position a recipient for filling thereof. This non-dispensing area that is typically adjacent to the dispensing area of the support device, e.g. extending on the side of the liquid food or beverage outlet, can be used for putting down recipients, typically upside down, after their use to allow any residual liquid, drips or spills to drain from the recipient and be evacuated to the collector. The non-dispensing area may operate as a draining board or draining rack for the recipients upon use.

Such an arrangement is of particular interest when the liquid food or beverage machine is at a location that is remote from any kitchen sink or separate draining board or draining rack. Typically, such a location can be in an office space where there is normally no kitchen arrangement. Hence, the used or dirty recipients can be put down onto the non-dispensing area of the support device and then be collected at a later stage for cleaning. It follows that people in the office may have their liquid food or beverage, typically coffee, nearby their desk and do not have to bring their cup to a kitchen sink or leave it on their desk, possibly with dripping liquid, but they may instead put it down onto the non-dispensing space of the machine's support device from where the cups may be picked up altogether at a later stage, e.g. by the cleaning staff.

Typically, the non-dispensing area is larger than the dispensing area, usually so that several used cups may be put down thereonto. For instance, the non-dispensing area and the dispensing area have a surface area ratio of at least 1.5, in particular in the range of 2 to 10, such as 2.5 to 6. The non-dispensing area may have a surface for supporting a number of side-by-side recipients in the range of 2 to 8, in particular 3 to 5 recipients. In practice, the dispensing area may have a size in the range of 5 to 80 $cm^2$, in particular 12 to 20 $cm^2$. The non-dispensing area may have a size in the range of 10 to 1000 $cm^2$, in particular 20 to 600 $cm^2$, such as 30 to 300 $cm^2$.

The support device may comprise a grid member or a plate-like member having at least one drain-hole or a foraminated or perforated plate-like member for evacuating liquid to the collector. The collector may be located underneath the support device or at a location, typically within the machine, connected to the support device via an arrangement, such as guide members or channels, for guiding liquid from the support device to the collector.

The support device may have a first structure for the dispensing area and a second structure for the non-dispensing area. For example, the dispensing area is arranged as a grid or perforated plate and the non-dispensing area is arranged as a draining surface, for instance a surface with a series of sloping grooves, for draining any liquid from the used recipients. Such a draining surface may lead to the dispensing area and/or the collector. For example, the collector may extend underneath the dispensing area and not significantly under the non-dispensing area, the non-dispensing area being in particular arranged to drain liquid to the collector, optionally via the dispensing area.

In one embodiment, the machine has a second support device, the dispensing area being sufficiently spaced from the outlet for accepting larger recipients, the second support device being at a shorter distance from the outlet for supporting smaller recipients underneath the outlet. Optionally, the second support device has an arrangement for evacuating liquid, in particular to the collector.

The second support device may be movable into an operative position between the outlet and the dispensing area for supporting a smaller recipient, and may be movable into a rest position away therefrom so that a larger recipient may be placeable on the dispensing area under the outlet. The second support device is in particular rotatable and/or slidable from its operating position into its rest position.

The second support device and the dispensing area can be formed of a similar structure, e.g. from a grid or perforated plate, for supporting a recipient and evacuating liquid.

The liquid food or beverage machine may have a platform supporting the liquid food or beverage module or from which the liquid food or beverage module extends upwards. The support device can extend along a front side of the platform below the outlet and sideways therefrom. Optionally, the platform extends sideways from the beverage module and/or has a support surface such as a heated surface for supporting clean recipients. Hence, the platform and the upright module may for instance be in a generally L-arrangement or a generally inverted-T arrangement, in cross-section.

The liquid food or beverage module can be associated with at least one further module, in particular a liquid food or beverage module or milk frothing device, such modules, i.e. the liquid food or beverage module and this further module, can be mounted side-by-side, the support device extending in front of both modules. Optionally, the non-dispensing area is located in front of a gap between the modules, e.g. forming generally an U-arrangement with the modules, and/or in front of a support surface adjacent to at least one of the modules.

It is also possible for the support device to extend around part or all the liquid food or beverage module, in particular along the front side and one or two lateral sides of the module. For example, the support device is generally L-shaped or U-shaped.

The support device and the collector can be separable en bloc from the module.

The invention also relates to a drip tray arrangement, in particular for a liquid food or beverage machine as described above. This drip tray arrangement comprises: a support device that has an arrangement for evacuating liquid; and a collector for collecting liquid evacuated by the support device. The support device comprises a dispensing area on or above which a recipient may be placed for collecting a liquid food or beverage dispensed from a corresponding outlet. In accordance with the invention, the support device further comprises a non-dispensing area adjacent to the dispensing area, the non-dispensing area being arranged to support recipients upon use and for evacuating liquid to the collector.

Such a drip tray arrangement may include any feature of combination of features of the collector and support device described above.

BRIEF DESCRIPTION OF THE DRAWINGS

The invention will now be described with reference to the schematic drawings, wherein:

FIG. 3 schematically shows another machine according to the invention having a generally U-shaped support device extending around a liquid food or beverage module; and FIG. 4 schematically shows another machine according to the invention having a generally L-shaped support device extending around a liquid food or beverage module.

DETAILED DESCRIPTION

Figure 1:
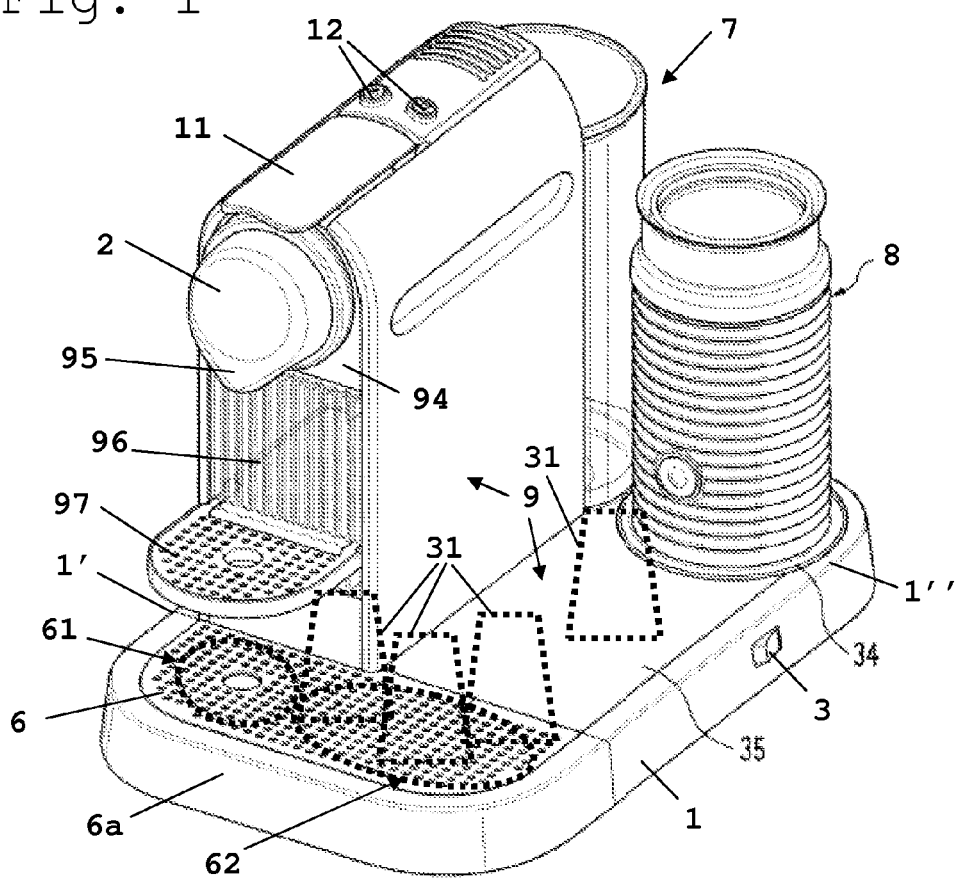
FIGS. 1 and 2 each illustrate a machine according to the invention having one and two liquid food or beverage modules on a laterally extending platform and a support device on a collector that extend in front of the platform.

FIG. 1 shows a liquid food or beverage machine according to the invention. The machine has a module 2 in a housing 9. Module 2 is arranged for receiving an ingredient and feeding a liquid to the ingredient. Module 2 is mounted on a platform 1 and extends along a lateral side 1' thereof. A beverage outlet 95 for dispensing beverage from module 2 extends through a front face 94 of housing 9.

Module 2 includes a brewing unit (not shown) that comprises an opening and closure handle 11 and means for holding a substance-containing capsule, e.g., a coffee capsule, and beverage delivery means such as a beverage duct 95. The holding means typically comprises a capsule holder and brewing cage, a fluid injection system for injecting water in the capsule and a closure device such as a lever and a knee joint mechanism. Suitable extraction modules are described in EP 1 859 713. Furthermore, housing 9 houses a used capsule receptacle 96 that is removably inserted under the brewing unit and outlet 95. Further possible features of module 2 are discussed in greater details in co-pending application EP07123009.

Platform 1 has at least the minimal functions as to the fluid and power management, which is supplying the liquid food or beverage module 2 with electrical power and with water from water tank 7 attached to the base platform externally to housing 9 and adjacent to the rear wall of housing 9.

A master switch 3 is mounted on platform 1 for shutting on and off the machine. Two user-buttons 12, typically for selecting a small or large quantity of liquid food or beverage to be prepared, are located above module 2.

Upper face 34 of platform 1 has means in the form of a STRIX™ connector (not shown) for connecting a milk frothing device 8. Such disconnectable connectors for the beverage or liquid food machine and frothing device 8 are for example disclosed in greater detail in WO 03/075629, WO 2008/046837 and in PCT/EP08/056349 which are hereby incorporated by way of reference.

Upper face 34 is adjacent neighbouring front face 35 that is optionally associated with a heating system, in particular integrated in platform 1, and that is arranged to support one or more cups 31 (indicated in dotted lines in FIG. 1) for preheating thereof prior to use.

As mentioned above, liquid food or beverage module 2 generally extends upwards within housing 9 adjacent a first lateral edge 1' of platform 1. On the other hand, frothing device 8 is generally located adjacent a second lateral edge of platform 1 opposite the first edge 1", so that housing 9 and platform 1 generally form in cross-section an L-shape that supports frothing device 8.

The liquid food or beverage machine also includes a support device 6 that is located under beverage outlet 95 and that is in the shape of a perforated plate for evacuating liquid. A collector 6a in the form of a shallow reservoir is located underneath support device 6 for collecting the evacuated liquid. Collector 6a does not require a high capacity for collecting liquid. Most of the time, collector 6a will only have to collect drips and spills.

Support device 6 and collector 6a are separable en bloc from platform 1 and module 2, for instance for emptying collector 6a and/or for cleaning.

In accordance with the invention, support device 6 comprising a dispensing area, generally indicated by doted line 61 on or above which a recipient 31 may be placed for collecting a liquid food or beverage dispensed from beverage outlet 95.

In accordance with the invention, support device 6 further comprises a non-dispensing area, generally indicated by doted lines 62, adjacent to dispensing area 61. Non-dispensing area 62 is arranged to support recipients, schematically indicated by dotted lines 31, upon use and for evacuating liquid, in particular drips from such used recipients 31, to collector 6a.

As illustrated in FIG. 1, support device 6 extends along a front side of platform 1 below outlet 95 and sideways from module 2 in front of face 35 and milk frothing device 8. Non-dispensing area 62 is about 3 times greater than dispensing area 61 and holds three side-by-side recipients 31 (indicated in dotted lines in FIG. 1) placed upside down, i.e. on their respective mouth.

Furthermore, the liquid food or beverage machine has above support device 6 a second support device 97 for supporting recipients 31 of smaller size underneath the outlet 95. Like main support device 6, second support device 97 has a perforated plate for the evacuation of liquid, in particular to collector 6a, optionally via support device 6. Second support device 97 is movable into a generally horizontal operative position between the outlet 95 and the dispensing area 61 for supporting a smaller recipient 31, as illustrated, and is movable into a generally upright or vertical rest position away therefrom so that a larger recipient is placeable on dispensing area 61 under outlet 95. Second support device 97 is in particular rotatable and/or slidable from its operative position into its rest position. Further details of possible features of such second support device are for example disclosed in EP 1 867 260.

Figure 2:
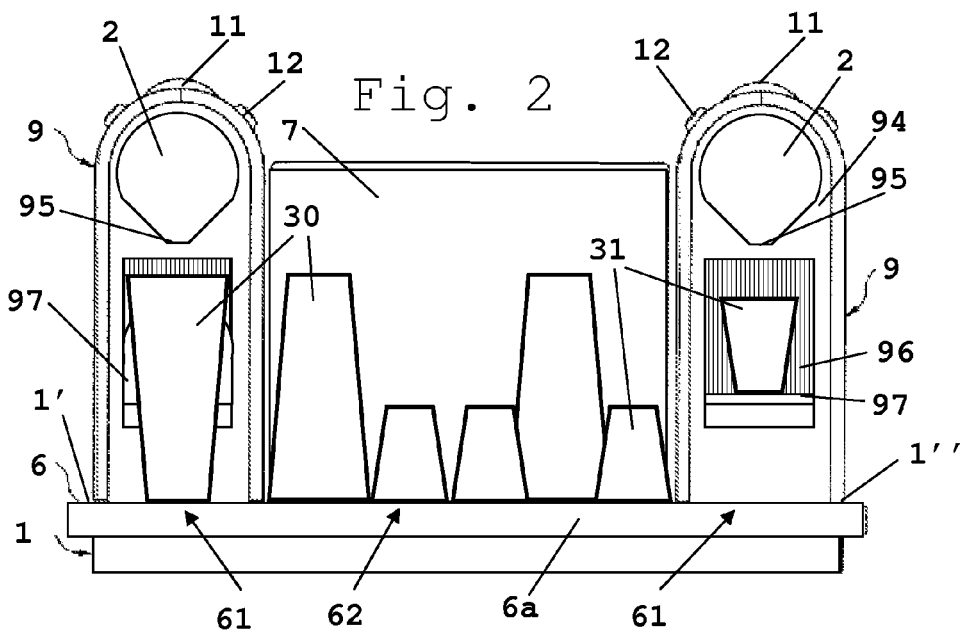

FIG. 2, in which the same numeric references generally designate the same elements, shows another embodiment of the invention.

The liquid food or beverage machine has two modules 2 in housings 9 that are mounted side-by-side and spaced apart on a platform 1 and arranged along opposite sides 1',1" of platform 1. A common water reservoir 7 extends between modules 2 at the back of platform 1.

On the left hand side of FIG. 2, module 2 is shown with its corresponding second support device 97 in its rest position, pivoted upwards, so that a large cup 30 can be placed on dispensing area 61 of main support device 6 under outlet 95.

On the right hand side of FIG. 2, module 2 is shown with its corresponding second support device 97 in its horizontal deployed operative position, like in FIG. 1, with a small cup 31 supported thereby under outlet 95.

Main support device 6 with collector 6a extends along the entire front part of platform 1, under outlet beverage 95 of each module 2. Main support device 6 forms a dispensing area 61 under each outlet 95 and a non-dispensing area 62 generally therebetween. Non-dispensing area 62 is not covered by any liquid food or beverage outlet. On the contrary, used cups 30,31, five or which are shown in FIG. 2, are placed upside-down onto non-dispensing area 62 and allowed to rest thereon like on a drain board.

Platform 1 may also include a support face (not shown) associated with a heating arrangement for supporting and pre-heating cups to be used. Such a support surface may extend between facing modules 2, support device 6 and water reservoir 7.

FIGS. 3 and 4 schematically show further arrangements of a cup or mug support device 6 with a collector 6a according to the invention.

In FIG. 3, support device 6 extends around a part of the liquid food or beverage machine, i.e. along side faces 91 and front face 94 of housing 9. In this embodiment, support device 6 is generally U-shaped around the machine. Support device 6 is made of 3 generally plate-like members placed end-to-end.

A central support member of support device 6 is located along the front face 94 underneath the liquid food or beverage outlet 95 to form a dispensing area 61. Collector 6a is generally located underneath this central member. Central support member includes a series of through-openings for allowing the passage of liquid therethrough to collector 6a.

Support device 6 further includes along each lateral side 91 of housing 9 a lateral support member. These lateral support members form two non-dispensing areas 62 and are in the general shape of draining boards with a series of longitudinal grooves for draining liquid towards collector 6a. Support device 6 can be arranged so that liquid drains from an end of a lateral support member directly into collector 6a or via the through-openings of central support member into collector 6a.

The lateral support members with the non-dispensing area 62 rest on platform 1. Collector 6a does not substantially extend underneath these lateral support members but is mainly located underneath the central support member with the dispensing area 61. However, collector 6a may conveniently extend below the ends of the lateral support members so that liquid may be drained directly from these ends into collector 6a.

The lateral support member on the right-hand side of FIG. 3 is arranged to support on non-dispensing area 62 large receptacles, such as mugs 30 (indicated in dotted lines), and is thus larger than the lateral support member on right-hand side of FIG. 3 which is arranged for supporting small receptacles, such as cups 31 (indicated in dotted lines). In a variation, it is of course possible to provide lateral support members with the same or similar width.

In FIG. 4, the liquid food or beverage machine has a platform 1 that supports in a housing 9 a module having a liquid food or beverage outlet 95. The platform has a heated support face 35 that is adjacent to the liquid food or beverage module and that is arranged to preheat cups 31 (indicated in dotted lines) resting thereon for subsequent use.

A Support device 6 having a dispensing area 61 and a non-dispensing area 62 is located around a front side and a lateral side of platform 1 and is generally L-shaped. Dispensing area 61 is located in front of front face 94 of housing 9 and underneath beverage outlet 95. Non-dispensing area 62 extends partly along the front part of platform 1 and partly along lateral edge 1" of platform 1 adjacent to face 35.

Collector 6a may extend under dispensing area 61 and non-dispensing area 62, or merely under dispensing area 61 like in FIG. 3. Alternatively, support device 6 may cooperate with two separate collectors 6a, one collector underneath dispensing area 61 and another one underneath non-dispensing area 62. In a further variation it is also possible to have a single collector 6a that extends along the front part of platform 1, i.e. underneath dispensing area 61 and under the front part of non-dispensing area 62, non-dispensing area 62 being arranged to drain liquid from the non-dispensing area 62 to the front part above collector 6a from where liquid can be drained into collector 6a.

In a yet further variation it is also possible to shape the dispensing area of the support member, for instance as a draining board, for draining liquid into a collector that is not located underneath the dispensing area. In yet a further variation, the collector cooperating with the support device may be arranged to collect also other waste fluids of the liquid food or beverage machine, in particular resulting from a cleaning or rinsing process or from a brewing process. For instance, such a fluid collector may be associated with a used ingredient collector, e.g. a used capsule collector, to collect residual liquid therefrom.

What is claimed is:

1. A machine for preparing liquid food or beverage from a pre-portioned beverage or food ingredient, comprising:
    a liquid food or beverage module having a liquid or beverage outlet;
    a collector for collecting liquid evacuated by the support device; and
    a first support device that is located under the beverage outlet and that has an arrangement for evacuating liquid, wherein the first support device extends around the module or at least along a front part and one or two sides of the module, and with the first support device comprising:
        a dispensing area on or above which a recipient may be placed for collecting a liquid food or beverage dispensed from the outlet, and
        a non-dispensing area laterally adjacent to the dispensing area so that it is not underlying any liquid or beverage outlet, with the non-dispensing area being sized and arranged to support and allow liquid drainage from multiple recipients inverted and placed thereupon after use, and also configured for evacuating drained liquid to the collector,
    wherein the non-dispensing area is larger than the dispensing area.

2. The machine of claim 1, wherein the non-dispensing area and the dispensing area have a surface area ratio of approximately between 1.5 and 10.

3. The machine of claim 1, wherein the non-dispensing area has a surface for supporting a number of side-by-side recipients in the range of 2 to 8 recipients.

4. The machine of claim 1, wherein the first support device comprises a grid member or a plate-like member having at least one drain-hole or a foraminated or perforated plate-like member for evacuating liquid to the collector and the collector is a drip tray.

5. The machine of claim 1, wherein the first support device covers the collector or is associated with an arrangement that includes one or more channels or guide members for evacuating liquid to the collector.

6. The machine of claim 1, further comprising a second support device having a second dispensing area spaced beneath the outlet and above the first dispensing area for accepting target recipients, with the second dispensing area being at a shorter distance beneath the outlet for supporting smaller target recipients beneath the outlet.

7. The machine of claim 6, wherein the second support device is movable into an operative position between the outlet and the dispensing area for supporting a smaller recipient, and is movable into a rest position away therefrom so that a larger recipient is placeable on the dispensing area under the outlet, with the second support device being rotatable or slidable from its operating position into its rest position and having an arrangement for evacuating liquid to the collector.

8. The machine of claim 7, wherein the second support device and the dispensing area are formed of a similar structure for supporting a recipient and evacuating liquid.

9. The machine of claim 1, further comprising a platform supporting the liquid food or beverage module or from which the liquid food or beverage module extends upwards, with the first support device extending along a front side of the platform below the outlet and sideways therefrom, and optionally with the platform extending sideways from the beverage module or having a heated support surface for supporting clean recipients.

10. The machine of claim 1, wherein the liquid food or beverage module is associated with at least one further liquid food or beverage module or milk frothing device, with the modules being mounted side-by-side, and the first support device extending in front of both modules, with the non-dispensing area being optionally located in front of a gap between the modules or in front of a support surface adjacent to at least one of the modules.

11. The machine of claim 1, wherein the first support device is generally L-shaped or U-shaped.

12. The machine of claim 1, wherein the first support device and the collector are separable en bloc from the module.

13. The machine of claim 1, wherein the dispensing area has a size of at least 5 or 12 $cm^2$ and the non-dispensing area has a size of at least 10 or 20 $cm^2$ adjacent to the dispensing area.

14. The machine of claim 1, wherein the non-dispensing area has a size of at least 30 $cm^2$.

15. The machine of claim 1 further comprising an integrated platform operatively associated with a heater and adjacent to the dispensing or non-dispensing area of the first support device for warming one or more recipients.

16. A machine for preparing liquid food or beverage from a pre-portioned beverage or food ingredient, comprising:
    a liquid food or beverage module having a liquid or beverage outlet;
    a collector for collecting liquid evacuated by the support device;
    a first support device that is located under the beverage outlet and that has an arrangement for evacuating liquid, wherein the first support device extends around the module or at least along a front part and one or two sides of the module; and
    a second support device that is located between the first support device and the liquid food or beverage module, the second support device is movable into an operative position between the outlet and the dispensing area for supporting a smaller recipient;

wherein the first support device comprises:
- a dispensing area on or above which a recipient may be placed for collecting a liquid food or beverage dispensed from the outlet, and
- a non-dispensing area laterally adjacent to the dispensing area so that it is not underlying any liquid or beverage outlet, with the non-dispensing area being sized and arranged to support and allow liquid drainage from multiple recipients inverted and placed thereupon after use, and also configured for evacuating drained liquid to the collector,
- wherein the non-dispensing area is larger than the dispensing area.

17. A drip tray arrangement for a liquid food or beverage machine as defined in claim 16, comprising:
- the second support device that has an arrangement for evacuating liquid; and
- the first support device that comprises a draining board for evacuating liquid; and
- a collector for collecting liquid evacuated by either the first or the second support device,
- wherein the first support device comprises a dispensing area on or above which a recipient may be placed for collecting a liquid food or beverage dispensed from a corresponding outlet, and includes a non-dispensing area adjacent to the dispensing area, with the non-dispensing area being sized and arranged to support and allow liquid drainage from multiple recipients inverted and placed thereupon after use, and also configured for evacuating drained liquid to the collector.

18. The arrangement of claim 17, wherein the collector is a drip tray, and the non-dispensing area and the dispensing area have a surface area ratio of approximately between 1.5 and 10.

19. The arrangement of claim 17, wherein the dispensing area has a size of at least 5 or 12 cm$^2$ and the non-dispensing area has a size of at least 10 or 20 cm$^2$ adjacent to the dispensing area, with the non-dispensing area being larger than the dispensing area.

20. The arrangement of claim 16, wherein the first and second support devices each comprises a grid member or a plate-like member having at least one drain-hole or a foraminated or perforated plate-like member for evacuating liquid to the collector and the collector is a drip tray.

21. The machine of claim 6, wherein the second support device comprises a grid member or a plate-like member having at least one drain-hole or a foraminated or perforated plate-like member for evacuating liquid to the drip tray.

* * * * *